US009332309B2

(12) United States Patent
Leontaris et al.

(10) Patent No.: US 9,332,309 B2
(45) Date of Patent: May 3, 2016

(54) SYNC FRAME RECOVERY IN REAL TIME VIDEO TRANSMISSION SYSTEM

(71) Applicant: Apple Inc., Cupertino, CA (US)

(72) Inventors: Athanasios Leontaris, Mountain View, CA (US); Haitao Guo, San Jose, CA (US); Xiaojin Shi, Fremont, CA (US)

(73) Assignee: Apple Inc., Cupertino, CA (US)

( * ) Notice: Subject to any disclaimer, the term of this patent is extended or adjusted under 35 U.S.C. 154(b) by 475 days.

(21) Appl. No.: 13/631,719

(22) Filed: Sep. 28, 2012

(65) Prior Publication Data

US 2013/0329809 A1    Dec. 12, 2013

Related U.S. Application Data

(60) Provisional application No. 61/657,609, filed on Jun. 8, 2012.

(51) Int. Cl.
*H04N 19/65* (2014.01)
*H04N 19/89* (2014.01)
(Continued)

(52) U.S. Cl.
CPC ....... *H04N 21/44209* (2013.01); *H04N 19/107* (2014.11); *H04N 19/164* (2014.11);
(Continued)

(58) Field of Classification Search
CPC ....... H04L 1/1816; H04L 1/819; H04L 1/858; H04L 1/189; H04N 19/65
USPC .......................................................... 375/240
See application file for complete search history.

(56) References Cited

U.S. PATENT DOCUMENTS

| 4,827,339 A | 5/1989 | Wada et al. |
| 5,703,889 A | 12/1997 | Shimoda et al. |

(Continued)

FOREIGN PATENT DOCUMENTS

WO    99/56472 A1    11/1999

OTHER PUBLICATIONS

Pat Mulroy, Mike Nilsson; "Windowed Reference Picture Selection for H.264 Transmission Error Recovery";2007; Broadband Applications Research Centre, BT, Adastral Park, Ipswich, UK.*

(Continued)

*Primary Examiner* — Sath V Perungavoor
*Assistant Examiner* — Clifford Hilaire
(74) *Attorney, Agent, or Firm* — Baker & Hostetler LLP

(57) ABSTRACT

An error recovery method may be engaged by an encoder to recover from misalignment between reference picture caches at the encoder and decoder. When a communication error is detected between a coder and a decoder, a number of non-acknowledged reference frames present in the decoder's reference picture cache may be estimated. Thereafter, frames may be coded as reference frames in a number greater or equal to the number of non-acknowledged reference frames that are estimated to be present in the decoder's reference picture cache. Thereafter, ordinary coding operations may resume. Typically, a final reference frame that is coded in the error recovery mode will be coded as a synchronization frame that has high coding quality. The coded reference frames that precede it may be coded at low quality (or may be coded as SKIP-coded frames). On reception and decoding, the preceding frames may cause the decoder to flush from its reference picture cache any non-acknowledged reference frames that otherwise might collide with the new synchronization frame. In this manner, alignment between the encoder and decoder may be restored.

29 Claims, 4 Drawing Sheets

(51) Int. Cl.

| | | |
|---|---|---|
| *H04N 21/442* | (2011.01) | |
| *H04N 21/6379* | (2011.01) | |
| *H04N 19/172* | (2014.01) | |
| *H04N 19/196* | (2014.01) | |
| *H04N 19/107* | (2014.01) | |
| *H04N 19/164* | (2014.01) | |

(52) U.S. Cl.
CPC ........... *H04N19/172* (2014.11); *H04N 19/196* (2014.11); *H04N 19/65* (2014.11); *H04N 19/89* (2014.11); *H04N 21/6379* (2013.01)

(56) References Cited

U.S. PATENT DOCUMENTS

| | | | | |
|---|---|---|---|---|
| 5,739,860 | A | 4/1998 | Hoshino et al. | |
| 6,049,570 | A * | 4/2000 | Fukunaga et al. | 375/240.12 |
| 6,357,028 | B1 | 3/2002 | Zhu | |
| 6,836,514 | B2 | 12/2004 | Gandhi et al. | |
| 8,265,145 | B1 | 9/2012 | Pejhan et al. | |
| 8,374,240 | B1 | 2/2013 | Namboodiri et al. | |
| 2004/0080669 | A1 | 4/2004 | Nagai et al. | |
| 2005/0031030 | A1* | 2/2005 | Kadono | G11B 27/105 375/240.01 |
| 2006/0098738 | A1 | 5/2006 | Cosman et al. | |
| 2006/0188025 | A1* | 8/2006 | Hannuksela | H04N 19/105 375/240.27 |
| 2007/0073779 | A1 | 3/2007 | Walker et al. | |
| 2007/0088971 | A1 | 4/2007 | Walker et al. | |
| 2008/0170564 | A1 | 7/2008 | Shi et al. | |
| 2009/0213938 | A1 | 8/2009 | Lee et al. | |
| 2009/0213940 | A1* | 8/2009 | Steinbach | H04N 19/176 375/240.27 |
| 2010/0150230 | A1* | 6/2010 | Zhou et al. | 375/240.12 |
| 2011/0069756 | A1 | 3/2011 | Matthews | |
| 2012/0287999 | A1 | 11/2012 | Li et al. | |
| 2013/0089152 | A1 | 4/2013 | Wang et al. | |
| 2013/0128948 | A1* | 5/2013 | Rabii et al. | 375/240.01 |
| 2013/0142257 | A1 | 6/2013 | Wang et al. | |

OTHER PUBLICATIONS

Xin-hao Chen, Lu Yu; "Distributed video coding with adaptive selection of hash functions"; Received Jun. 16, 2010; Revision accepted Nov. 19, 2010; Crosschecked Mar. 31, 2011;Journal of Zhejiang University-SCIENCE C (Computers & Electronics) ISSN 1869-1951 (Print); ISSN 1869-196X (Online).*
Chen, Xin-hao, and Lu Yu. "Distributed video coding with adaptive selection of hash functions." Journal of Zhejiang University SCIENCE C 12.5 (2011): 387-396.*
Mulroy, Pat, and Mike Nilsson. "Windowed reference picture selection for H.264 transmission error recovery." Proc. Int. Picture Coding Symp.(PCS). 2007.*
Zhang, Chongyang, et al. "Cross-Layer frame discarding for cellular video coding." Acoustics, Speech and Signal Processing, 2007. ICASSP 2007. IEEE International Conference on. vol. 2. IEEE, 2007.*
Bross et al., "High Efficiency Video Coding (HEVC) Text Specification Draft 7," Joint Collaborative Team on Video Coding (JCT-VC) of ITU-T SG16 WP3 and ISO-IEC JTC1/SC29/WG11, 9th Meeting: Geneva, CH, Apr. 27-May 7, 2012.
Bross et al., "High Efficiency Video Coding (HEVC) Text Specification Draft 8," Joint Collaborative Team on Video Coding (JCT-VC) of ITU-T SG16 WP3 and ISO/IEC JTC1/SC29/WG11, 10th Meeting: Stockholm, SE, Jul. 11-20, 2012.
Bross et al., "High Efficiency Video Coding (HEVC) Text Specification Draft 10 ( for FDIS & Consent)," Joint Collaborative Team on Video Coding (JCT-VC) of ITU-T SG16 WP3 and ISO/IEC JTC1/SC29/WG11, 12th Meeting: Geneva, CH, Jan. 14-23, 2013.
Bross et al., "High Efficiency Video Coding (HEVC) Text Specification Draft 6," Joint Collaborative Team on Video Coding (JCT-VC) of ITU-T SG16 WP3 and ISO/IEC JTC1/SC29/WG11, 7th Meeting: Geneva, CH, Nov. 21-30, 2011.
Kim et al., "Channel Adaptive Error Resilience Scheme for Video Transmission Over Mobile WiMAX," IEICE Transactions on Communications, Communications Society, Tokyo, JP, Vol. E91-B, No. 10, Oct. 1, 2008, pp. 3052-3059.
Fukunaga et al., "Error Resilient Video Coding by Dynamic Replacing of Reference Pictures," IEEE Globecom, vol. 3, Nov. 18, 1996, pp. 1503-1508.
Aissa et al., "Coding with Dynamic Rate Control for Low-Delay Image Transmission over CDMA Fading Channels," Vehicular Technology Conference, IEEE, vol. 2, May 18, 1998, pp. 1488-1492.
Duong et al., "Efficient Frame Error Concealment Using Bilateral Motion Estimation for Low-Bit Rate Video Transmission," IEICE Transactions on Communications, Communications Society, Tokyo, JP, vol. E92B, No. 2, Feb. 1, 2009, pp. 461-472,
Cote et al., "Using GFID in Error Prone Environments," ITU Study Group 16—Video Coding Experts Group, Feb. 16, 1999, p. 1.
PCT International Search Report and Written Opinion for PCT/US2013/043395, mailed on Dec. 13, 2013, 20 pages.
Stephan Wenger et al., "Error Resilience Support in H.263+," Tampere, Finland, Video Coding Experts Group of ITU-T SG.16, Document No. Q15-D-17, Apr. 15, 1998, XP030002765, 21 pages.
Rickard Sjoberg et al., "Absolute signaling of reference pictures," Joint Collaborative Team on Video Coding (JCT-VC) of ITU-T SG16 WP3 and ISO/IEC JTC1/SC29/WG11, 6th Meeting: Torino, Document No. JCTVC-F493, m20923, Jul. 22, 2011, XP030049486, 15 pages.
Pat Mulroy et al., "Windowed Reference Picture Selection for H.264 Transmission Error Recovery," Broadband Research Centre, BT, Adastral Park, Ipswich, UK, Nov. 7, 2007, XP030080494, 4 pages.
Dr Stephan Wenger, "Video Redundancy Coding Simulation Results," 2 VCEG Meeting, Sunriver, OR, Video Coding Experts Group of ITU-T SG, 16, Document No. Q15-B-18, Sep. 3, 1997, XP030002657, 8 pages.
Taiwanese Office Action, issued Feb. 12, 2015, from corresponding Taiwanese Patent Application No. 102120406, filed Jun. 7, 2013.

* cited by examiner

100

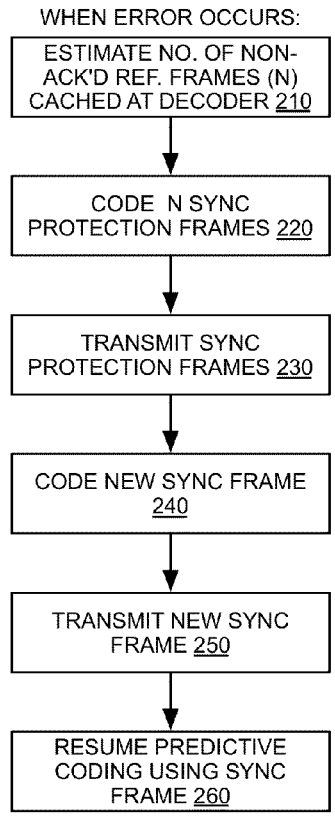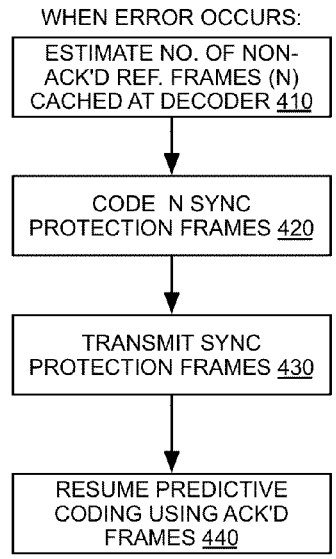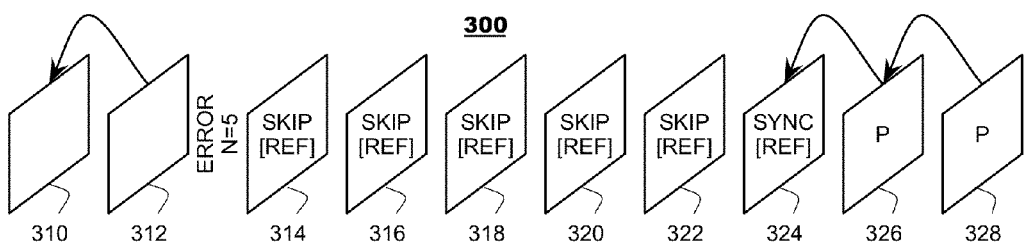

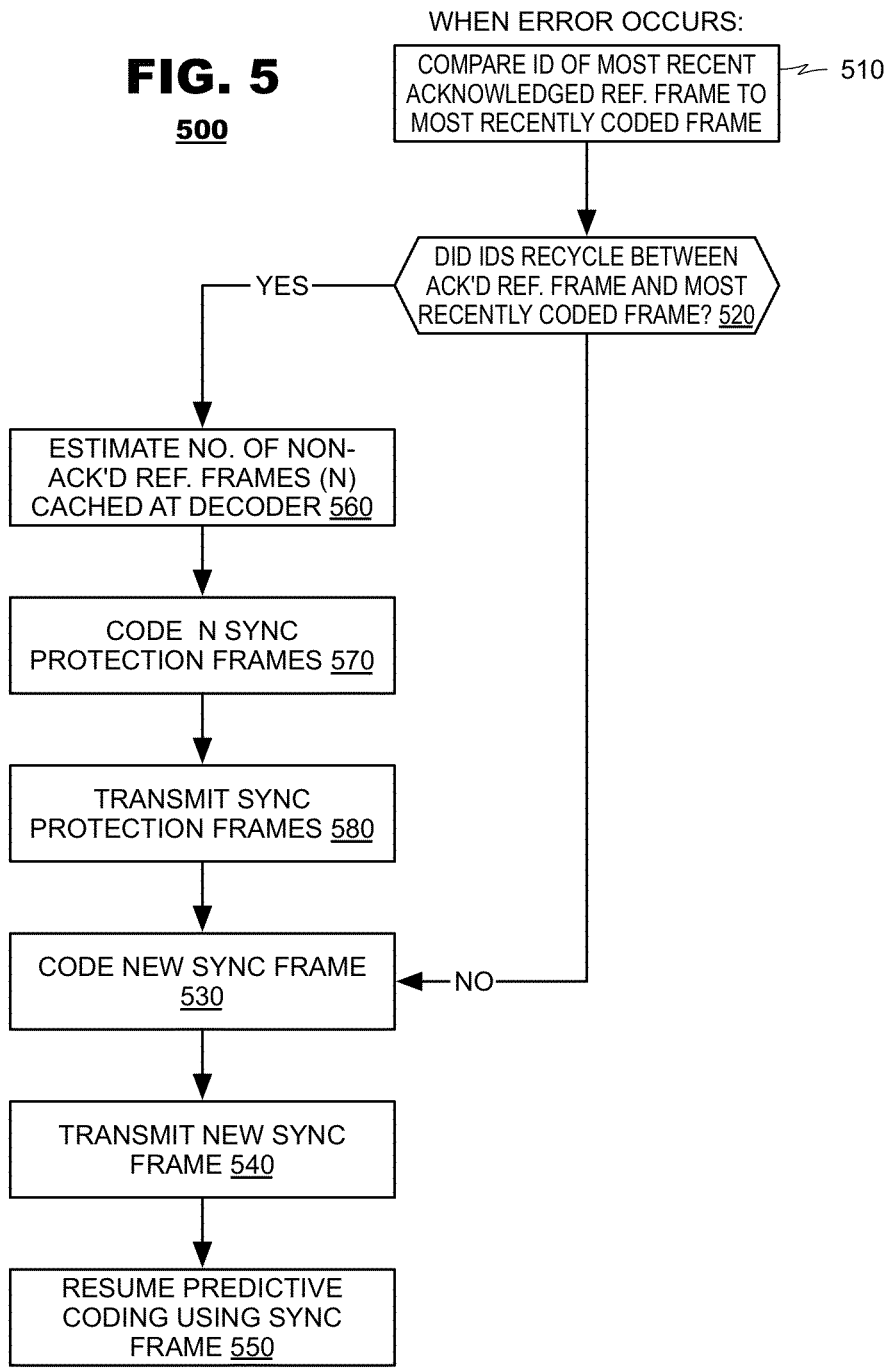

600

SYNC FRAME RECOVERY IN REAL TIME VIDEO TRANSMISSION SYSTEM

CROSS-REFERENCE TO RELATED APPLICATIONS

This application claims priority to U.S. Provisional Patent Application No. 61/657,609, filed on Jun. 8, 2012, and entitled "Sync Frame Recovery in Real Time Video Transmission System," the disclosure of which is incorporated herein in its entirety.

BACKGROUND

Many video compression standards, e.g., H.264, have been widely used in real time video transmission systems to satisfy network bandwidth requirements. One of the major challenges in such systems is to stop error propagation and recover from a transmission error. In typical solutions, a video encoder embeds a "sync point" in the video stream when a transmission error is detected. A sync point is a coded frame that codes video either from a known good starting point between the encoder and decoder, if one exists, or from scratch (e.g., an instantaneous decoder refresh ("IDR") frame). Thus, the sync frame stops error propagation. However, this approach works only when the sync point can be received and processed properly by a video decoder, which does not always occur in practical communication environments. There are various scenarios in which error propagation cannot be stopped even when a sync frame is properly received by a decoder and acknowledged to the encoder.

In modern compression standards, video decoders typically differentiate reference frames from each other through frame index information that is carried within the frame/slice syntax and serves to label each reference frame. This information consists usually of a couple of numbers that serve to identify the display and coding order of the frame. For example, in H.264, the "frame_num" parameter, primarily, and the picture order count ("POC"), secondarily, are the numbers used for this purpose. For the HEVC standard currently being developed by the ITU-T and ISO/IEC, a POC field is used for the same purpose. To save bits, encoders and decoders constrain the number of bits used to identify these reference frames. For example, in H.264, using 8 bits for the frame_num parameter allows the parameter to take any value from 0 to 255. Once the index reaches 256, it wraps around and takes the value 0.

When network errors occur, it is possible that a large continuous segment of video frames will be dropped, either in the network transmission layer or the media transfer layer. In one scenario, this may be caused by severe network errors affecting the network transmission layer. To reduce bandwidth, coding protocols do not require all coded reference frames to be acknowledged by the transmission layer and, therefore, an encoder may not have an accurate estimate of the state of reference picture buffer at the receiver side. In another scenario, the network error may be moderate, resulting to losses of single isolated frames in the network transmission layer. However, at the sender side, unless a new sync frame is produced by the encoder so that the error can be stopped, all the frames in the transmission buffer that follow the problematic frame in coding order will be continuously dropped since they refer to an erroneous reference frame. In a different scenario, the network error may be moderate and a segment of frames following a lost frame may have been sent out from the sender by the time the encoder is notified of the error (since the sender is informed of the transmission error with some delay). However, at the receiver side, since the previous frame was flagged as lost, the receiver may drop all following frames in coding order, even if they are correctly received, since they cannot be properly reconstructed due to the loss of the reference frame. Thus, a large segment of frames could be dropped even when the network error condition is moderate. The encoder keeps on encoding and updating the frame index, e.g. incrementing, even if these frames never reach the receiver side. Depending on the number of frames that are coded between the time instance the network error occurred and the generation of the sync point the frame index may get recycled.

If an encoder codes a sync frame in response to a transmission error, it becomes possible that the new sync frame may have the same index as one of the reference frames that is stored already in the decoder reference buffer or a frame that has been received, was not dropped at the media transfer layer, but has not yet been decoded. Coding standards do not specify how to handle the situation when two reference frames "collide," they have the same frame index in the decoder reference buffer. Nor do coding standards specify decoding behavior when two consecutively received frames have the same index. Thus, the behavior of decoders in such cases is undefined and unpredictable. This could lead to corruption of the sync frame and future frames that were supposed to predict from the sync frame at the receiver side. Thus, the purpose of sending a sync frame is defeated.

If a video encoder receives an acknowledgement indicating that the sync frame has been properly passed to the decoder, the encoder/sender may not send/request further sync frames. The encoder may resume ordinary coding processes notwithstanding the fact that its estimate of the decoder's reference buffer state is inaccurate. Since subsequent video frames would be predicted from the sync frame, errors will propagate throughout the rest of the video session at the receiver side as the system operates under the 'assumption' there is no error.

BRIEF DESCRIPTION OF THE DRAWINGS

FIG. 2 illustrates a method according to an embodiment of the present invention.

FIG. 3 illustrates an exemplary sequence of coded frames according to an embodiment of the present invention.

FIG. 4 illustrates a method according to another embodiment of the present invention.

FIG. 5 illustrates a method according to a further embodiment of the present invention.

DETAILED DESCRIPTION

Embodiments of the present invention provide an error recovery method that can be engaged by an encoder to recover alignment with a decoder. When a communication error is detected between a coder and a decoder, a number of non-acknowledged reference frames present in the decoder's reference picture cache may be estimated. Thereafter, frames may be coded as reference frames in a number equal to the number of non-acknowledged reference frames that are estimated to be present in the decoder's reference picture cache. Thereafter, ordinary coding operations may resume. Typically, a final reference frame that is coded in the error recovery mode will be coded as a synchronization frame that has high coding quality. The coded reference frames that precede it may be coded at low quality (or may be coded as SKIP-coded frames). The preceding frames are called "sync protection frames" herein because, on reception and decoding, they may cause the decoder to flush from its reference picture cache any non-acknowledged reference frames that otherwise might collide with the new synchronization frame. In this manner, alignment between the encoder and decoder may be restored.

Figure 1:
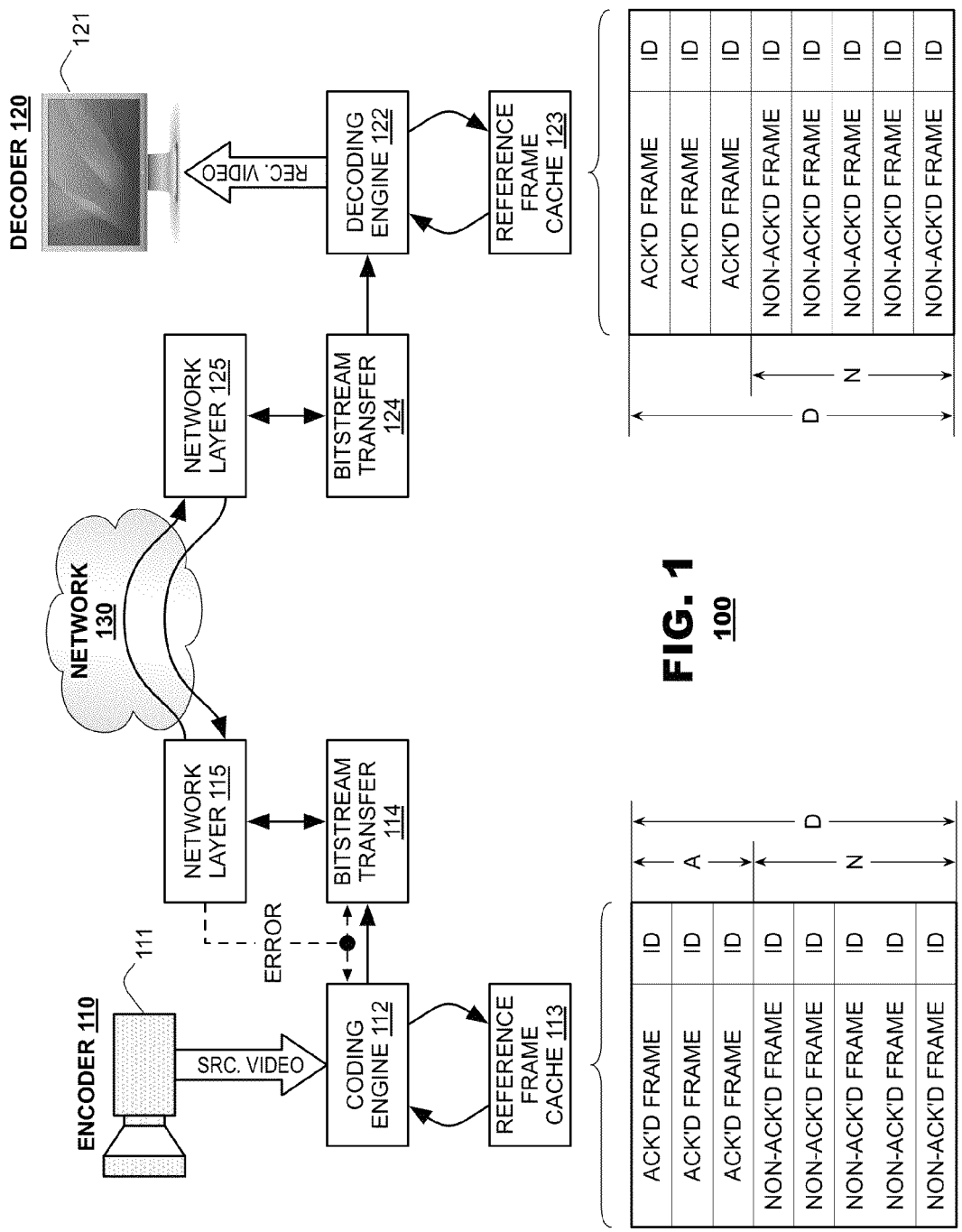
FIG. 1 illustrates an encoder/decoder system according to an embodiment of the present invention.

FIG. 1 is a simplified block diagram of an encoder/decoder system 100 according to an embodiment of the present invention. The system 100 may include an encoder 110 and a decoder 120 interconnected via a network 130. The encoder 110 may generate video data representing locally-captured image information and may code it for delivery over the network 130. The network 130 may deliver the coded video to a decoder 120. Some coding protocols involve lossy coding techniques, in which case, the decoder 120 may generate a recovered video sequence that represents an approximation of the source video. Other coding protocols may be lossless, in which case, the decoder 120 may generate a recovered video sequence that replicates the source video. In either case, the decoder 120 may output the recovered video sequence for local viewing.

In FIG. 1, the encoder 110 and decoder 120 may be provided within a variety of computing platforms, including servers, personal computers, laptop computers, tablet computers, smart phones, media players and/or dedicated video conferencing equipment. The network 130 represents any number of networks that convey coded video data among the encoder 110 and decoder 120, including for example wireline and/or wireless communication networks. A communication network may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present invention unless explained hereinbelow.

The encoder 110 may include a video source 111, a coding engine 112, a reference frame cache 113, a bitstream transfer unit 114 and a network layer processor 115. The video source 111 may generate the video sequence for coding. Typical video sources 111 include cameras that generate video from locally-captured image information and storage devices or screen buffers (not shown) in which video may be stored, e.g., for media serving applications. The coding engine 112 may code frames of video data according to motion-compensated or intra predictive coding. The reference frame cache 113 may store decoded video data obtained from coded frames marked as reference frames by the coding engine 112 for use in predictive coding of other frames. The coding engine 112 may generate the decoded video data using a process that is fully replicated at the decoding engine 122 yielding identical decoded video data in the event of no transmission or system (media transfer) errors. The encoder 112, thus, may include functionality that is a superset of functionality within the decoder 122 since it may replicate decoding functions. The bitstream transfer unit 114 may store coded video data as it is output by the coding engine 112 and awaiting transmission via the network 130. The network layer processor 115 may manage communication of video data to a decoder 120 over a network channel.

The decoder 120 may include a rendering unit 121, a decoding engine 122, a reference frame cache 123, a bitstream transfer unit 124 and a network layer processor 125. These components invert operations of the encoder 110. The network layer processor 125 may manage reception of data received from the encoder 110 via the network 130. The bitstream transfer unit 124 may the received data, may parse the data into component data streams and may forward coded video data to the decoding engine 122. The decoding engine 122 may invert coding processes applied by the coding engine 112 and generate decoded video therefrom. The decoding engine 122 may output the recovered video data to the rendering unit 121 for consumption. The rendering unit 121 may be a display, a storage device or scaler (not shown) to which recovered video data may be output. The decoding engine 122 may output the recovered video data of reference frames to the reference frame cache 123, which may store the decoded reference frames for use in later decoding operations.

FIG. 1 also schematically illustrates entries of the reference frame caches 113, 123. The caches 113, 123 each may have sufficient capacity to store a predetermined number of reference frames. The encoder 110 and decoder 120 operate according to common cache management policies that are designed to ensure their caches 113, 123 operate in synchronization in the absence of channel errors. When transmission errors occur that cause coded reference frames to be lost, the decoder's reference frame cache 123 typically will lose synchronization with the encoder's reference frame cache 113.

The system 100 may support two different types of reference frames. "Acknowledged frames" are frames that are acknowledged by a decoder/network transmission layer 120 via signaling and, once acknowledged, are confirmed to the encoder 110 to have been stored properly in the reference frame cache 123 of the decoder 120. "Non-acknowledged frames" are frames that are not so acknowledged by the decoder/network transmission layer 120 and, therefore, are not confirmed to the encoder 110 to have been stored properly in the reference frame cache 123 of the decoder 120.

The reference frame caches 113, 123 may store identifiers in association with each reference frame. The frame IDs typically are derived from identifiers that are present in coded video data and associated with each frame. For example, in H.264 and the upcoming HEVC (currently in draft) video coding standard, each frame is assigned an identifier based on the frame's position within a group of pictures ("GOP"), which may relate to its display or coding order. A GOP is a subset of the sequence that can be decoded without any reference to any frame outside the GOP. The first frame in each GOP usually resets these identifiers. GOP reference frames that follow the first frame usually will increment previous frame indices. Due to the limits on the frame ID written to the bitstream, the range of the values of these identifiers is often not enough to ensure unique indices for all frames in a GOP. The indices may recycle. The reference frame cache may store an identifier that is derived from least significant digits of the frame's position identifier. Thus, other reference frames, whether they are from the same GOPs or from other GOPs, may have the same frame ID when stored in the reference frame caches 113, 123. Other coding protocols, for example future coding standards, may derive their frame IDs via other processes.

During operation, frames of input video data may be coded by the coding engine 112 and output to the bitstream transfer unit 114. The bitstream transfer unit 114 may include a buffer (not shown) to store coded video data until it is to be transmitted and may include sub-systems to merge the coded video data with other data streams, such as audio data and/or metadata (also not shown), into a channel bitstream for transmission. The network layer processor 115 may retrieve channel bitstream data, format it for delivery over the network 130 and transmit the formatted data to the network 130.

The network layer processor 115 also may receive indicators from the network 130 and/or the decoder 120 (via the network 130) regarding transmission or bitstream transfer layer errors that may occur on the channel bitstream. The network layer processor 115 may provide error indications to the coding engine 112 and/or the bitstream transfer unit 114. In response, the coding engine 112 may engage error recovery processes as described herein. The bitstream transfer unit 114 also may respond to error notifications by purging its queues of coded data that awaits transmission, as described herein.

The network layer processor 125 of the decoder 120 may manage communication with the network 130. In the absence of transmission errors, the network layer processor 125 may receive the channel bitstream and forward the bitstream to a local bitstream transfer unit 124. When transmission errors occur, the network layer processor 125 may report error indicators to the encoder 110 via the network 130. The bitstream transfer unit 124 may store the received data in a queue (not shown), parse the data into component data streams such as coded video streams, coded audio streams, etc. The bitstream transfer unit 124 may forward the coded video data to the decoding engine 122. When the decoding engine 122 decodes reference frames that are marked as requiring acknowledgments to the encoder 110, the decoder 120 may create acknowledgment messages which are transmitted to the encoder 110 via the bitstream transfer unit 124 and network layer 125 (path not shown in FIG. 1).

FIG. 2 illustrates a method 200 for responding to channel errors according to an embodiment of the present invention. According to the method 200, when a channel error occurs, an encoder may estimate a number of non-acknowledged frames that likely are stored at a decoder (box 210). In response, the encoder codes several sync protection frames and marks them as reference frames (box 220). The encoder may transmit the sync protection frames to the decoder (box 230). Thereafter, the encoder may code a new input frame as a sync frame (box 240) and may transmit the sync frame to the decoder (box 250). Thereafter, the encoder may resume normal predictive coding operations using the sync frame as a basis of prediction (box 260). As the encoder performs its coding operations, it may be constrained to prevent any of the sync protection frames from serving as a prediction reference for other frames.

The method of FIG. 2 finds application in circumstances where a transmission error may cause the reference frame cache 123 (FIG. 1) at a decoder 120 to lose synchronization with the reference frame cache 113 at the encoder 110. In such circumstances, because reference frame IDs are not unique within a coding session, it is possible that without remediation a decoder may use a prediction reference improperly and retrieve data from an incorrect reference frame.

If, for example, a continuous set of frames is lost including frames that are marked as reference frames, a decoder will never decode the set of frames and therefore store their reconstructed video data in its reference frame cache. If a new frame is coded using a lost reference frame as a basis of prediction, it is possible that the decoder reference frame cache will contain a different reference frame in its place, from some other set of frames that were previously successfully decoded, that matches the prediction reference indicated for the new frame. In H.264 a prediction reference is indicated using a reference index that is not directly tied to the frame ID. An erroneous reference may thus be used even if the erroneous and original reference frames have different frame IDs. In the upcoming HEVC standard, the reference indication is directly tied to the frame ID, thus a decoder can detect errors. However, if the frame IDs match, it will still use the erroneous reference. In either case, the decoder 120 would retrieve data from the reference frame cache using some wrong reference picture. These scenarios may arise in many use cases, for example in coding environments with prolonged network delay, or in systems where a bitstream transfer unit at a decoder experiences a malfunction and coded video data is lost or corrupted.

The method of FIG. 2 overcomes such error conditions. When an encoder 110 (FIG. 1) detects that a channel error has occurred or that the decoder's reference picture cache may be misaligned with respect to the encoder's reference picture cache, it may estimate a number N of non-acknowledged frames resident in the decoder's reference picture cache (box 210). The encoder 110 may do so by examining its own reference frame cache 113 (FIG. 1) and estimating a number A of acknowledged frames in it. The number N of non-acknowledged frames may be derived from the depth D of the reference frame cache 113 less the number A of acknowledged frames stored therein. By coding and transmitting a number of sync protection frames to match the number of non-acknowledged frames stored in the reference frame cache 113 (boxes 220, 230), the encoder 110 may ensure that the sync protection frames flush all non-acknowledged frames from the decoder's reference frame cache 123.

This approach is appropriate for any coder/decoder system that employs a decoder reference cache, allows reference frame indices to collide (whether due to network error or not), and tries to use a sync frame to stop error propagation. For example, the approach is appropriate for us with encoder/decoder systems that operate according to the MPEG-2, MPEG-4, H.264, SVC, and HEVC coding protocols. The standards, however, differ in the way a frame is designated as a reference. A reference frame in H.264 is indicated with a flag in the frame, while in HEVC, a reference frame is indicated with a temporal layer indication flag and an identifier of a frame in the reference picture sets of subsequent frames to ensure it stays in the reference frame cache. In fact, in one HEVC-based embodiment, instead of sending sync protection frames an encoder may accomplish the same effect by only signaling in the reference picture sets of the sync frame and of subsequent frames the acknowledged frames.

Alternatively, the encoder 110 may code a number of sync protection frames to be one less than the number (N−1) of non-acknowledged frames in the encoder. This embodiment becomes appropriate when the encoder 110 has a priori knowledge of how the decoder 120 handles reference frame collisions as well as knowledge of the current number of acknowledged frames. For example, when the encoder 110 confirms, either from conventions of the coding protocol under which they operate or from signaling provided by the decoder 120, that a decoder 120 does not combine different frames with the same frame index together, it can code a number of sync protection frames as number of non-acknowledged frames minus one. In this circumstance, the sync protection frames, when received by the decoder, would flush all non-acknowledged frames that precede the transmission error save one. When the encoder codes and transmits the sync frame, the sync frame would flush the last of the non-acknowledged frames that preceded the transmission error.

Sync frames may be coded as instantaneous decoder refresh ("IDR") frames or I-frames. In some embodiments, the sync frames may be coded as a P-frame that refers to an acknowledged frame stored by decoder as a prediction reference. Sync frames may be marked as reference frames. An encoder 110 has discretion to mark coded sync frames as frames that must be acknowledged by a decoder 120. It is expected that, in many applications, coded sync frames will be marked as frames that must be acknowledged by a decoder 120 so the encoder 110 gets confirmation that the error condition has been remediated.

In an embodiment, sync protection frames may be coded to have limited size. For example, the sync protection frames may be coded as SKIP frames under the MPEG-2, MPEG-4 Part 2, H.264 and/or HEVC coding standard. SKIP frames conventionally are interpreted by a decoder 120 merely to repeat image content of a preceding frame. Using a SKIP frame has two advantages in responding to such error conditions. First, the SKIP frames usually are coded with a very limited number of bits per frame, which permits the encoder 110 and decoder 120 to recover from an error condition with limited signaling and overhead.

Second, when the SKIP frames are decoded, they are decoded with reference to a most-recently decoded reference frame. When an error occurs that causes the decoder 120 to no longer output frames, rendering applications (not shown) at the decoder 120 usually choose to repeat display of a most-recently decoded frame. Since an encoder 110 does not have knowledge of which frame is being displayed when a transmission error arises, sending new coded video with different video content than is displayed could potentially create a content discontinuity at the decoder. However, using SKIP frame allows decoder 120 to make a copy of the displayed image and display it. Thus, regardless of the image content being displayed or the state of the decoder 120, the SKIP frames may cause a decoder 120 to repeat display of a most-recently displayed frame before the error arose. Thus, the SKIP mode sync protection frames allow the encoder 110 and decoder 120 to recover gracefully from the transmission error in a manner that retains continuity with image content being displayed at the decoder 120 at the time of the error.

The sync protection frames are not constrained to be coded as SKIP-coded frames and other embodiments of the present invention permit the sync protection frames to be coded as I-frames, P-frames or B-frames. When the sync protection frames are coded as P- or B-frames, an encoder may code them with reference to acknowledged reference frame(s) that are known by the encoder's coding engine 112 to remain present at the decoder's reference picture cache 123. In such embodiments, however, coding of sync protection frames as I-frames, P-frames or B-frames raises the likelihood that, during rendering, a flash or other corruption will be displayed on the screen. Even with a brief content flash, however, the I-, P- or B-coded sync protection frame will serve the purpose of protecting the sync frame that will be transmitted later. When the I-, P- or B-coded sync protection frame is decoded, it will be stored in the decoder's reference picture cache 123 and will contribute to eviction of previously-stored non-acknowledged reference frames.

In another embodiment, rather than code a sync protection frame as a SKIP-coded frame, an encoder may code frames as inter-coded frames (e.g. P- or B-frames) but impose zero-valued motion vectors and zero-valued coded block patterns (CBP), which prevents prediction residuals from being coded.

In another embodiment, when scalable video coding is used, an encoder 110 may code sync protection frames using a base layer and enhancement layer data with zero-valued residuals in the enhancement layer.

In a further embodiment, an encoder 110 may code sync protection frames as P- or B-frames in which all macroblocks are assigned SKIP modes.

Another approach is to send long-term reference ("LTR") frames as sync protection frames. They will serve the purpose of flushing the decoder's reference picture cache. Once previously stored non-acknowledged frames are all evicted from the cache and the sync frame has been transmitted, an encoder 120 may send Memory Management Control Operation ("MMCO") commands to evict the LTR frames from the decoder's reference picture cache.

In another approach where the decoder operation is in a controlled system and can be modified to depart from the strict standard (i.e. H.264) specification, one may send a supplemental enhancement information ("SEI") message to force the decoder to flush all the short-term reference frames or the list of unacknowledged frames from its decoded picture buffer ("DPB").

FIG. 3 illustrates an exemplary sequence of coded frames according to an embodiment of the present invention, working from the exemplary reference cache state of FIG. 1. As illustrated, frames 310, 312 represent coding operations that may occur before an error occurs. Coded representations of the frames 310, 312 may not be transmitted by a network layer processor if the frames on which they rely for prediction are estimated to be lost as part of a transmission error.

A transmission error is shown as detected following coding of frame 312. At this point, as shown in FIG. 1, an encoder 110 may estimate the number N of non-acknowledged frames stored at the decoder reference frame cache 123 based on the depth D of the cache and the number A of acknowledged frames stored in the cache. In this example, N=5.

Thereafter, the encoder 110 may code a number of new frames 314-322 (N=5) via the coding engine 112 and have them marked as reference frames. These frames 314-322 are sync protection frames. The coding engine 112 may output the coded sync protection frames to the bitstream transfer unit 114. In an embodiment, the coding engine 112 may designate to the bitstream transfer unit 114 that the sync protection frames must be transmitted by the network layer processor 115 (e.g., they cannot be evicted from queue in the bitstream transfer unit 114).

Frame 324 represents a sync frame that is coded and transmitted pursuant to boxes 240-250 (FIG. 2).

Beginning at frame 326, the encoder may resume ordinary coding operations using the sync frame and/or the previously-stored acknowledged frames as a basis for prediction.

FIG. 4 illustrates a method 400 for responding to channel errors according to another embodiment of the present invention. According to the method 400, when a channel error occurs, an encoder may estimate a number of non-acknowledged frames that likely are stored at a decoder (box 410). In response, the encoder may code a predetermined number of new frames and mark them as reference frames (box 420). These frames are sync protection frames. The sync protection frames may be coded using the processes described above. The encoder may transmit the sync protection frames to the decoder (box 430). Thereafter, the encoder may resume normal predictive coding operations using acknowledged frames as a basis of prediction (box 440). As the encoder performs its coding operations, it may be constrained to prevent any of the sync protection frames from serving as a prediction reference for other frames.

The method of FIG. 4 provides similar advantages as the method of FIG. 2 without requiring any overhead from coding and transmission of a sync frame. In both methods, an encoder may disqualify sync protection from serving as prediction references of other frames notwithstanding their designation in the channel bitstream as reference frames. Once the sync protection frames evict whatever non-acknowledged frames may have been stored in the reference frame cache of the decoder and so long as the sync protection frames are not used for prediction of other frames, an encoder may otherwise resume normal coding operations.

FIG. 5 illustrates a method according to another embodiment of the present invention. In this embodiment, the method 500 may estimate a number of frames that have been lost due to an error event and assess whether a frame collision could have occurred. Sync protection frames may not be necessary if, for example, the frame IDs have not recycled within the span of frames that were lost.

As illustrated in FIG. 5, when a network error occurs, the method 500 may compare an identifier of current frame to be coded to a corresponding identifier of a most recently acknowledged reference frame present in an encoder's reference picture cache (box 510). The method 500 may determine whether identifiers were recycled between the most recently acknowledged reference frame and the current frame (box 520). If not, then there is no risk of collision. The method may code a new sync frame (box 530) and transmit it (box 540), then return to ordinary coding operations (box 550). If identifiers were recycled, then the method 500 may engage in operations to counteract against possible collision of reference frame identifiers. In the example illustrated in FIG. 5, boxes 560-580 correspond to operations of boxes 210-230 of FIG. 2. Alternatively, the method 500 may engage the operations of FIG. 4.

Figure 6:
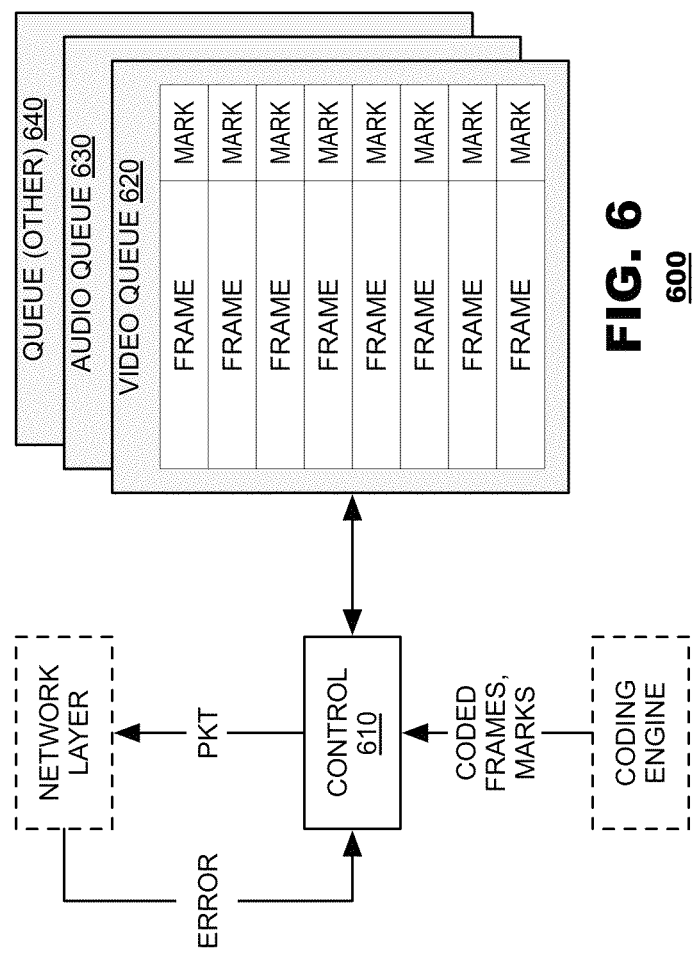
FIG. 6 illustrates a bitstream transfer unit according to an embodiment of the present invention.

FIG. 6 is a simplified block diagram of a bitstream transfer unit 600 according to an embodiment of the present invention. The bitstream transfer unit 600 may include a controller 610 and a plurality of transmission queues for different types of data to be transmitted to a decoder. The controller 610 may receive coded video data from a coding engine and may store the coded video data in a video queue 620. The bitstream transfer unit 600 also may receive data from other sources, such as audio data, and may store them in respective queues 630, 640. During transmission, the controller 610 may retrieve data from the respective queues 620-640, format them into delivery units (called "packets" herein) and output them to the network layer.

With respect to the video queue 620, the bitstream transfer unit 600 may store data of coded frames in storage awaiting transmission. Although not illustrated in FIG. 6, different coded frames may have different bit sizes. The bitstream transfer unit 600 may recognize partitions between coded frames for storage and retrieval purposes. The bitstream transfer unit 600 also may engage in signaling with the coding engine to allow the coding engine to mark different coded frames as having high or low priority for transmission, or as constituting frames that can or cannot be evicted from queue 620 prior to transmission or as representing reference frames vs. non-reference frames. In an embodiment, a controller 610 may interpret coded video data from the coding engine well enough to recognize sync frames and reference frames, which permits the controller 610 to recognize such frames autonomously without express signaling from the coding engine.

In an embodiment, when the network layer processor reports an error to the bitstream transfer unit 600, the bitstream transfer unit 600 may evict all frames from the video queue 620. Doing so avoids transmission of coded frames that likely refer to lost reference frames as sources of prediction.

Other embodiments of the present invention permit a coding engine and a bitstream transfer unit 600 to work cooperatively to recover from transmission errors. For example:

In one embodiment, a controller 610 may retain in the video queue 620 frames that are marked as reference frames, flushing non-reference frames. In this embodiment, the reference frames may be transmitted to the decoder. Further, the bitstream transfer unit 600 may report the number of reference frames pending in queue to the coding engine, which may consider them as sync protection frames for error recovery purposes. Hypothetically, if an encoder determines to code five sync protection frames to recover from an error but the bitstream transfer unit 600 stores two reference frames at the time the error occurred, the encoder need only code three sync protection frames to ensure the decoder's reference picture cache has been flushed. This embodiment avoids latency that might otherwise be incurred if the full number of sync protection frames were coded.

In another embodiment, a controller 610 may determine whether the video queue 620 stores an IDR frame available for transmission. In this case, the bitstream transfer unit 600 may transmit the IDR frame to the decoder and all subsequently-coded frames. The bitstream transfer unit 600 may engage in signaling with the coding engine to prevent the error recovery process from being engaged. The IDR itself may reset the coding state of the decoder.

The foregoing discussion has described operation of the embodiments of the present invention in the context of encoders and decoders. Commonly, video encoders and decoders are provided as electronic devices. They can be embodied in integrated circuits, such as application specific integrated circuits, field programmable gate arrays and/or digital signal processors. Alternatively, they can be embodied in computer programs that execute on personal computers, notebook computers, computer servers or mobile devices, such as smartphones and tablet computers. Similarly, decoders can be embodied in integrated circuits, such as application specific integrated circuits, field programmable gate arrays and/or digital signal processors, or they can be embodied in computer programs that execute on personal computers, notebook computers computer servers or mobile devices, such as smartphones and tablet computers. Decoders commonly are packaged in consumer electronics devices, such as gaming systems, DVD players, portable media players and the like and they also can be packaged in consumer software applications such as video games, browser-based media players and the like.

Moreover, a single encoder/decoder pair may support video delivery in only one direction—from an encoder 110 (FIG. 1) to a decoder 120. Many devices support bidirectional transmission of coded video. For bidirectional transmission of data, each device may include both an encoder and a decoder. The device would include an encoder to generate video data from locally captured video and code it for delivery to another device. The same device would include a decoder to receive coded video data from the other device, decode video therefrom and display the decoded video data at a local display device. Such devices may include encoder-side components and decoder-side components consistent with the foregoing discussion.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. An error protection method for a video coder, comprising:
   when a communication error is detected between a coder and a decoder, estimating a number of non-acknowledged reference frames present in the decoder's reference picture cache;

coding a number of frames as reference frames at least equal to the number of non-acknowledged reference frames; and thereafter, resuming ordinary coding operations.

2. The error protection method of claim 1, wherein the estimated number of non-acknowledged frames is taken from a depth of a local reference picture cache less a number of acknowledged reference frames stored therein.

3. The error protection method of claim 1, wherein at least one of the coded reference frames is coded as a SKIP frame.

4. The error protection method of claim 1, wherein when a plural number of non-acknowledged reference frames is estimated, a number of reference frames at least equal to the estimated number are coded as SKIP frames.

5. The error protection method of claim 1, wherein when a plural number of non-acknowledged reference frames is estimated, a number of reference frames at least equal to the estimated number save one are coded as SKIP frames and a final reference frame is coded in a mode other than SKIP-mode.

6. The error protection method of claim 1, wherein at least one of the coded reference frames has no coded image content.

7. An error protection method for a video coder, comprising:

when a communication error is detected between a coder and a decoder, estimating a number of non-acknowledged reference frames present in the decoder's reference picture cache;

estimating a probability that a picture identifier of a newly coded frame may collide with picture identifier(s) of a non-acknowledged reference frame in the decoder's reference picture cache;

based on the estimated probability, coding a number of frames as reference frames at least equal to the number of non-acknowledged reference frames if necessary; and thereafter, resuming ordinary coding operations.

8. The error protection method of claim 7, wherein the estimated number of non-acknowledged frames is taken from a depth of a local reference picture cache less a number of acknowledged reference frames stored therein.

9. The error protection method of claim 7, wherein at least one of the coded reference frames is coded as a SKIP frame.

10. The error protection method of claim 7, wherein when a plural number of non-acknowledged reference frames is estimated, a number of reference frames equal to the estimated number are coded as SKIP frames.

11. An error protection method for a video coder, comprising:

when a communication error is detected between a coder and a decoder, determining whether the coder has a coded frame awaiting transmission that was coded as an IDR frame;

if the coder has a coded IDR frame awaiting transmission, transmitting the coded IDR frame and, thereafter, coding new frames predictively with respect to a frame following the IDR frame; and if the coder does not have a coded IDR frame awaiting transmission, estimating a number of non-acknowledged reference frames present in the decoder's reference picture cache, coding a number of frames as reference frames equal to the number of non-acknowledged reference frames, and thereafter, resuming ordinary coding operations.

12. An error protection method for a video coder, comprising:

when a communication error is detected between a coder and a decoder, flushing frames in a transmission queue at the encoder that depend on non-acknowledged reference frame(s);

transmitting any coded frames in the transmission queue that depend on acknowledged reference frames;

thereafter, estimating a number of non-acknowledged reference frames present in a decoder's reference picture cache taking into account the transmitted coded frames that depend on acknowledged reference frames;

coding a number of frames as reference frames equal to the estimated number of non-acknowledged reference frames minus the number of reference frames in the queue; and thereafter, resuming ordinary coding operations.

13. An error protection method for a video coder, comprising:

when a communication error is detected between a coder and a decoder, estimating a number of non-acknowledged reference frames present in the decoder's reference picture cache;

coding a number of sync protection frames equal to the number of non-acknowledged reference frames;

coding another frame as a synchronization frame representing content of a source video sequence, wherein the sync protection frames and the synchronization frame are sufficient in aggregate to flush the estimated number of non-acknowledged reference frames from the decoder's reference picture cache; and thereafter, resuming ordinary coding operations using the synchronization frame as a basis of prediction.

14. The method of claim 13, wherein the sync protection frames are coded as SKIP-mode frames.

15. The method of claim 13, wherein the sync protection frames are coded having no image content.

16. The method of claim 13, wherein at least one sync protection frame is coded predictively using data of an acknowledged reference frame as a basis of prediction.

17. The method of claim 13, wherein at least one sync protection frame is coded as an intra-coded frame.

18. The method of claim 13, further comprising, flushing a transmission queue, at the encoder, of frames that depend on non-acknowledged frames.

19. The method of claim 13, further comprising, flushing a transmission queue, at the encoder, of frames based on an SEI transmission.

20. A video coder, comprising:

a reference picture cache storing decoded data of coded reference frames, the cache also storing identifiers distinguishing whether each such stored reference frame has been acknowledged by a decoder or not;

a coding engine to:

when a communication error is detected between the coder and a decoder, estimate a number of non-acknowledged reference frames present in the decoder's reference picture cache;

code a number of frames as reference frames equal to the number of non-acknowledged reference frames; and thereafter, resume ordinary coding operations.

21. The coder of claim 20, wherein the coding engine codes at least one of the coded reference frames as a SKIP frame.

22. The coder of claim 20, wherein, when the coding engine's estimation identifies a plural number of non-acknowledged reference frames at the decoder, the coding engine codes a number of reference frames equal to the estimated number as SKIP frames.

23. The coder of claim 20, wherein, when the coding engine's estimation identifies a plural number of non-acknowledged reference frames at the decoder, the coding engine
- codes a number of reference frames equal to the estimated number save one as SKIP frames, and
- codes a final reference frame in a mode other than a SKIP-mode coded frame.

24. An error protection method for a video decoder, comprising:
- when a communication error is detected, signaling a communication error to a decoder;
- thereafter, receiving a coding sequence from an encoder that includes one or more coded sync protection frames and a coded synchronization frame, wherein the number of sync protection frame(s) and synchronization frames in aggregate at least equals to an estimated number of non-acknowledged reference frames in a reference picture cache at the decoder;
- decoding the coded sync protection frame(s) and the synchronization frame; and
- storing decoded data representing the decoded sync protection frame(s) and the decoded synchronization frame in the reference picture cache, wherein all non-acknowledged reference frames that were present in the reference picture cache prior to the communication error are evicted from the reference picture cache.

25. The method of claim 24, wherein the received sync protection frame(s) are coded as SKIP-mode frames.

26. The method of claim 24, wherein the sync protection frame(s) are coded having no image content.

27. The method of claim 24, further comprising decoding at least one sync protection frame predictively using data of an acknowledged reference frame present in the decoder's reference picture cache as a basis of prediction.

28. The method of claim 24, further comprising decoding at least one sync protection frame as an intra-decoded frame.

29. A video decoder, comprising:
- a reference picture cache storing decoded data of coded reference frames, some of which are acknowledged by the decoder to an encoder but others of which are not acknowledged;
- a decoding engine to:
  - receive a coding sequence from an encoder that includes one or more coded sync protection frames and a coded synchronization frame, wherein the number of sync protection frame(s) and synchronization frames in aggregate at least equals to or exceeds an estimated number of non-acknowledged reference frames in a reference picture cache at the decoder;
  - decode the coded sync protection frame(s) and the synchronization frame; and
  - store decoded data representing the decoded sync protection frame(s) and the decoded synchronization frame in the reference picture cache, wherein all non-acknowledged reference frames that were present in the reference picture cache prior to reception of the coding sequence are evicted from the reference picture cache.

* * * * *